US007269416B2

(12) United States Patent
Guthrie et al.

(10) Patent No.: US 7,269,416 B2
(45) Date of Patent: Sep. 11, 2007

(54) UNIVERSAL VEHICLE BASED GARAGE DOOR OPENER CONTROL SYSTEM AND METHOD

(75) Inventors: Warren E. Guthrie, West Olive, MI (US); Kurt A. Dykema, Holland, MI (US); Jody K. Harwood, Canton, MI (US)

(73) Assignee: Lear Corporation, Southfield, MI (US)

( * ) Notice: Subject to any disclaimer, the term of this patent is extended or adjusted under 35 U.S.C. 154(b) by 589 days.

(21) Appl. No.: 10/630,058

(22) Filed: Jul. 30, 2003

(65) Prior Publication Data

US 2005/0026605 A1 Feb. 3, 2005

(51) Int. Cl.
*H04M 3/00* (2006.01)

(52) U.S. Cl. ...................... 455/420; 455/418; 455/419; 455/99; 455/344; 455/345; 455/41.2; 340/5.22; 340/5.26; 340/825.69; 340/825.72; 340/5.7

(58) Field of Classification Search ........ 455/418–420, 455/41.1–2, 68–71, 88, 569.2, 575.1, 9, 90.1–3, 455/95, 99, 344–345; 340/5.1–2, 5.21–26, 340/5.31–33, 825.69, 825.72, 5.7, 825.22, 340/69

See application file for complete search history.

(56) References Cited

U.S. PATENT DOCUMENTS 1,522,241 A 1/1925 Hennessey
3,098,212 A 7/1963 Creamer, Jr.
3,300,867 A 1/1967 Sampson
3,337,992 A 8/1967 Tolson
3,456,387 A 7/1969 Tolson
3,680,951 A 8/1972 Jordan et al.
4,074,200 A 2/1978 Buchta (Continued)

FOREIGN PATENT DOCUMENTS

DE 42 04 463 A1 8/1992

(Continued)

OTHER PUBLICATIONS

Garage Door/Gate Remote Control User's Instructions (Model 39), Skylink Technologies Inc., 2002.

(Continued)

*Primary Examiner*—Matthew D. Anderson
*Assistant Examiner*—Tuan Tran
(74) *Attorney, Agent, or Firm*—Brooks Kushman P.C.

(57) ABSTRACT

A vehicle-based control system and method for use with a barrier operating system that includes a motor, a receiver in communication with the motor, and a remote transmitter for transmitting an activation signal to the receiver. The activation signal includes a radio frequency carrier signal modulated with a codeword for use in activating the motor to open and close the barrier. A vehicle-mounted transceiver receives multiple radio frequency carrier signals, and transmits an activation signal for receipt by the barrier operating system receiver. A vehicle-mounted controller stores the received radio frequency carrier signals, and receives user input identifying an activation scheme having a variable codeword format. The controller generates a variable codeword based on the identified activation scheme, selects one of the stored carrier signals, and controls the transceiver to transmit an activation signal having the selected carrier signal modulated with the generated variable codeword in response to user input.

17 Claims, 3 Drawing Sheets

U.S. PATENT DOCUMENTS

| | | | | |
|---|---|---|---|---|
| 4,167,833 | A | | 9/1979 | Farina et al. |
| 4,178,549 | A | | 12/1979 | Ledenbach et al. |
| 4,219,812 | A | | 8/1980 | Rittenbach |
| 4,241,870 | A | | 12/1980 | Marcus |
| 4,247,850 | A | | 1/1981 | Marcus |
| 4,425,717 | A | | 1/1984 | Marcus |
| 4,447,808 | A | | 5/1984 | Marcus |
| 4,453,161 | A | | 6/1984 | Lemelson |
| 4,482,947 | A | | 11/1984 | Zato et al. |
| 4,529,980 | A | | 7/1985 | Liotine et al. |
| 4,535,333 | A | | 8/1985 | Twardowski |
| 4,581,827 | A | | 4/1986 | Higashi |
| 4,595,228 | A | | 6/1986 | Chu |
| 4,598,287 | A | | 7/1986 | Osakabe et al. |
| 4,623,887 | A | | 11/1986 | Welles, II |
| 4,631,708 | A | | 12/1986 | Wood et al. |
| 4,635,033 | A | | 1/1987 | Inukai et al. |
| 4,638,433 | A | | 1/1987 | Schindler |
| 4,665,397 | A | | 5/1987 | Pinnow |
| 4,676,601 | A | | 6/1987 | Itoh et al. |
| 4,700,327 | A | | 10/1987 | Hilton |
| 4,703,359 | A | | 10/1987 | Rumbolt et al. |
| 4,706,299 | A | | 11/1987 | Jorgensen |
| 4,707,788 | A | | 11/1987 | Tashiro et al. |
| RE32,576 | E | | 1/1988 | Pastore |
| 4,727,302 | A | | 2/1988 | Mizuta et al. |
| 4,743,905 | A | | 5/1988 | Wiegand |
| 4,747,159 | A | | 5/1988 | Kato |
| 4,750,118 | A | | 6/1988 | Heitschel et al. |
| 4,754,255 | A | | 6/1988 | Sanders et al. |
| 4,771,283 | A | | 9/1988 | Imoto |
| 4,793,690 | A | | 12/1988 | Gahan et al. |
| 4,799,189 | A | | 1/1989 | Grover |
| 4,806,930 | A | | 2/1989 | Wojciak, Jr. |
| 4,825,200 | A | | 4/1989 | Evans et al. |
| 4,866,434 | A | | 9/1989 | Keenan |
| 4,881,148 | A | | 11/1989 | Lambropoulos et al. |
| 4,882,565 | A | | 11/1989 | Gallmeyer |
| 4,886,960 | A | | 12/1989 | Molyneux et al. |
| 4,890,108 | A | | 12/1989 | Drori et al. |
| 4,896,030 | A | | 1/1990 | Miyaji |
| 4,905,279 | A | | 2/1990 | Nishio |
| 4,912,463 | A | | 3/1990 | Li |
| 4,917,477 | A | | 4/1990 | Bechtel et al. |
| 4,953,305 | A | | 9/1990 | Van Lente et al. |
| 4,959,810 | A | | 9/1990 | Darbee et al. |
| 4,978,944 | A | | 12/1990 | Andros et al. |
| 4,988,992 | A | | 1/1991 | Heitschel et al. |
| 5,016,996 | A | | 5/1991 | Ueno |
| 5,064,274 | A | | 11/1991 | Alten |
| 5,085,062 | A | | 2/1992 | Capdevila |
| 5,103,221 | A | | 4/1992 | Memmola |
| 5,109,222 | A | | 4/1992 | Welty |
| 5,113,821 | A | | 5/1992 | Fukui et al. |
| 5,122,647 | A | | 6/1992 | Lynam et al. |
| 5,123,008 | A | | 6/1992 | Beesley |
| 5,126,686 | A | | 6/1992 | Tam |
| 5,146,215 | A | | 9/1992 | Drori |
| 5,154,617 | A | | 10/1992 | Suman et al. |
| 5,181,423 | A | | 1/1993 | Philipps et al. |
| 5,191,610 | A | | 3/1993 | Hill et al. |
| 5,193,210 | A | | 3/1993 | Nicholas et al. |
| 5,201,067 | A | | 4/1993 | Grube et al. |
| 5,225,847 | A | | 7/1993 | Roberts et al. |
| 5,243,322 | A | | 9/1993 | Thompson et al. |
| 5,252,960 | A | | 10/1993 | Duhame |
| 5,252,977 | A | | 10/1993 | Lueker et al. |
| 5,266,945 | A | | 11/1993 | Peek et al. |
| 5,278,547 | A | | 1/1994 | Suman et al. |
| 5,369,706 | A | | 11/1994 | Latka |
| 5,379,453 | A | | 1/1995 | Tigwell |

| | | | | |
|---|---|---|---|---|
| 5,402,105 | A | | 3/1995 | Doyle et al. |
| 5,408,698 | A | | 4/1995 | Serizawa et al. |
| 5,412,379 | A | | 5/1995 | Waraksa et al. |
| 5,420,925 | A | | 5/1995 | Michaels |
| 5,442,340 | A | | 8/1995 | Dykema |
| 5,455,716 | A | | 10/1995 | Suman et al. |
| 5,463,374 | A | | 10/1995 | Mendez et al. |
| 5,471,668 | A | | 11/1995 | Soenen et al. |
| 5,473,317 | A | | 12/1995 | Inomata et al. |
| 5,475,366 | A | | 12/1995 | Van Lente et al. |
| 5,479,155 | A | | 12/1995 | Zeinstra et al. |
| 5,481,256 | A | | 1/1996 | Darbee et al. |
| 5,510,791 | A | | 4/1996 | Viertel et al. |
| 5,517,187 | A | | 5/1996 | Bruwer et al. |
| 5,528,230 | A | | 6/1996 | Kim |
| 5,554,977 | A | | 9/1996 | Jablonski, Jr. |
| RE35,364 | E | | 10/1996 | Heitschel et al. |
| 5,564,101 | A | | 10/1996 | Eisfeld et al. |
| 5,583,485 | A | | 12/1996 | Van Lente et al. |
| 5,594,429 | A | | 1/1997 | Nakahara |
| 5,596,316 | A | | 1/1997 | Honeck |
| 5,598,475 | A | | 1/1997 | Soenen et al. |
| 5,613,732 | A | | 3/1997 | Demick |
| 5,614,885 | A | | 3/1997 | Van Lente et al. |
| 5,614,891 | A | | 3/1997 | Zeinstra et al. |
| 5,614,906 | A | | 3/1997 | Hayes et al. |
| 5,619,190 | A | | 4/1997 | Duckworth et al. |
| 5,627,529 | A | | 5/1997 | Duckworth et al. |
| 5,645,308 | A | | 7/1997 | Fink |
| 5,646,701 | A | | 7/1997 | Duckworth et al. |
| 5,661,455 | A | | 8/1997 | Van Lente et al. |
| 5,661,651 | A | | 8/1997 | Geschke et al. |
| 5,661,804 | A | * | 8/1997 | Dykema et al. ............ 380/274 |
| 5,680,131 | A | | 10/1997 | Utz |
| 5,680,134 | A | | 10/1997 | Tsui |
| 5,686,903 | A | | 11/1997 | Duckworth et al. |
| 5,686,904 | A | | 11/1997 | Bruwer |
| 5,691,848 | A | | 11/1997 | Van Lente et al. |
| 5,699,044 | A | | 12/1997 | Van Lente et al. |
| 5,699,054 | A | | 12/1997 | Duckworth |
| 5,699,055 | A | | 12/1997 | Dykema et al. |
| 5,708,415 | A | | 1/1998 | Van Lente et al. |
| 5,715,020 | A | | 2/1998 | Kuroiwa et al. |
| 5,726,645 | A | | 3/1998 | Kamon et al. |
| 5,731,756 | A | | 3/1998 | Roddy |
| 5,751,224 | A | | 5/1998 | Fitzgibbon |
| 5,758,300 | A | | 5/1998 | Abe |
| 5,774,064 | A | | 6/1998 | Lambropoulos |
| 5,790,948 | A | | 8/1998 | Eisfeld et al. |
| 5,793,300 | A | | 8/1998 | Suman et al. |
| 5,810,420 | A | | 9/1998 | Welling |
| 5,812,097 | A | | 9/1998 | Maldonado |
| 5,831,548 | A | | 11/1998 | Fitzgibbon |
| 5,838,255 | A | | 11/1998 | Di Croce |
| 5,841,253 | A | | 11/1998 | Fitzgibbon et al. |
| 5,841,390 | A | | 11/1998 | Tsui |
| 5,841,813 | A | | 11/1998 | Van Nee |
| 5,844,473 | A | | 12/1998 | Kaman |
| 5,845,593 | A | | 12/1998 | Birkestrand |
| 5,854,593 | A | * | 12/1998 | Dykema et al. ....... 340/825.22 |
| 5,872,513 | A | | 2/1999 | Fitzgibbon et al. |
| 5,903,226 | A | | 5/1999 | Suman et al. |
| 5,910,784 | A | | 6/1999 | Lai |
| 5,926,087 | A | | 7/1999 | Busch et al. |
| 5,926,106 | A | | 7/1999 | Beran et al. |
| 5,940,000 | A | | 8/1999 | Dykema |
| 5,940,007 | A | | 8/1999 | Brinkmeyer |
| 5,940,120 | A | | 8/1999 | Frankhouse et al. |
| 5,949,349 | A | | 9/1999 | Farris et al. |
| 5,990,828 | A | | 11/1999 | King |
| 5,995,898 | A | | 11/1999 | Tuttle |
| 6,002,332 | A | | 12/1999 | King |
| 6,005,508 | A | | 12/1999 | Tsui |

6,008,735 A 12/1999 Chiloyan et al.
6,020,829 A 2/2000 Hormann
6,021,319 A 2/2000 Tigwell
6,023,241 A 2/2000 Clapper
6,025,785 A 2/2000 Farris et al.
6,031,465 A 2/2000 Burgess
6,043,753 A 3/2000 Okayasu et al.
6,049,289 A 4/2000 Waggamon et al.
6,055,468 A 4/2000 Kaman et al.
6,055,508 A 4/2000 Naor et al.
RE36,703 E 5/2000 Heitschel et al.
6,072,404 A 6/2000 Nolan et al.
6,072,436 A 6/2000 Marougi
6,078,271 A 6/2000 Roddy et al.
6,081,203 A 6/2000 Fitzgibbon
6,091,330 A 7/2000 Swan et al.
6,091,343 A 7/2000 Dykema et al.
6,097,309 A 8/2000 Hayes et al.
6,104,101 A 8/2000 Miller et al.
6,127,740 A 10/2000 Roddy et al.
6,127,922 A 10/2000 Roddy et al.
6,127,961 A 10/2000 Stacy et al.
6,130,625 A 10/2000 Harvey
6,131,019 A 10/2000 King
6,137,421 A 10/2000 Dykema
6,144,114 A 11/2000 Chutorash
6,154,148 A 11/2000 Fluharty et al.
6,154,544 A 11/2000 Farris et al.
6,157,319 A 12/2000 Johns et al.
6,160,319 A 12/2000 Marougi et al.
6,166,650 A 12/2000 Bruwer
6,175,312 B1 1/2001 Bruwer et al.
6,181,255 B1 1/2001 Crimmins et al.
6,188,889 B1 2/2001 Tsai
6,191,701 B1 2/2001 Bruwer
6,236,350 B1 5/2001 Andrews
6,243,000 B1 6/2001 Tsui
6,249,673 B1 6/2001 Tsui
6,265,987 B1 7/2001 Wang et al.
6,271,765 B1 8/2001 King et al.
6,275,379 B1 8/2001 Quinno et al.
6,282,152 B1 8/2001 Kurple
6,292,230 B1 9/2001 Shui et al.
6,308,083 B2 10/2001 King
6,320,514 B1 11/2001 Flick
6,333,698 B1 12/2001 Roddy
6,344,817 B1 2/2002 Verzulli
6,359,558 B1 3/2002 Tsui
6,362,771 B1 3/2002 Schofield et al.
6,377,173 B1 4/2002 Desai
6,396,408 B2 5/2002 Drummond
6,397,058 B1 * 5/2002 Thibert et al. ........... 455/414.1
6,414,587 B1 7/2002 Fitzgibbon
6,426,706 B1 7/2002 King
6,441,719 B1 8/2002 Tsui
6,472,885 B1 10/2002 Green et al.
6,486,795 B1 11/2002 Sobel et al.
6,512,461 B1 1/2003 Benzie et al.
RE37,986 E 2/2003 Heitschel et al.
6,525,645 B2 2/2003 King et al.
6,529,556 B1 3/2003 Perdue et al.
6,542,076 B1 4/2003 Joao
6,556,681 B2 4/2003 King
6,556,813 B2 4/2003 Tsui
6,559,775 B1 5/2003 King
6,597,291 B2 7/2003 Tsui
6,597,374 B1 7/2003 Baker et al.
6,634,408 B2 10/2003 Mays
6,661,350 B1 12/2003 Rohrberg et al.
6,690,796 B1 2/2004 Farris et al.
6,703,941 B1 * 3/2004 Blaker .................. 340/825.69
6,724,339 B2 4/2004 Conway et al.
6,747,568 B1 6/2004 Teskey
6,759,350 B2 7/2004 Tsai
6,774,813 B2 8/2004 van Ee et al.
6,791,467 B1 9/2004 Ben-Ze'ev
6,810,123 B2 10/2004 Farris et al.
6,822,603 B1 11/2004 Crimmins et al.
6,903,650 B2 * 6/2005 Murray ...................... 340/5.23
6,956,460 B2 10/2005 Tsui
6,963,267 B2 * 11/2005 Murray ....................... 340/5.7
6,975,203 B2 * 12/2005 Brookbank et al. ........ 340/5.26
2001/0007086 A1 7/2001 Rogers et al.
2002/0034303 A1 3/2002 Farris et al.
2002/0067826 A1 6/2002 King
2002/0075133 A1 6/2002 Flick
2002/0126037 A1 9/2002 Fitzgibbon
2002/0137479 A1 9/2002 Tsui
2002/0140569 A1 10/2002 van Ee et al.
2002/0163440 A1 11/2002 Tsui
2002/0190872 A1 12/2002 Suman et al.
2002/0191794 A1 12/2002 Farris et al.
2002/0197955 A1 12/2002 Witkowski et al.
2003/0016119 A1 1/2003 Teich
2003/0016139 A1 1/2003 Teich
2003/0033540 A1 2/2003 Fitzgibbon
2003/0067394 A1 4/2003 Tsui
2003/0076235 A1 4/2003 Tsui
2003/0085798 A1 5/2003 Castro Esteban
2003/0112121 A1 6/2003 Wilson
2003/0118187 A1 6/2003 Fitzgibbon
2003/0153306 A1 8/2003 Study et al.
2003/0189530 A1 10/2003 Tsui
2003/0197594 A1 10/2003 Olson et al.
2003/0197595 A1 10/2003 Olson et al.
2003/0216139 A1 11/2003 Olson et al.
2003/0228879 A1 12/2003 Witkowski et al.
2004/0017292 A1 1/2004 Reese et al.
2004/0048622 A1 3/2004 Witkowski et al.
2004/0061591 A1 4/2004 Teich
2004/0066936 A1 4/2004 Farris et al.
2004/0100391 A1 5/2004 Guthrie
2004/0110472 A1 6/2004 Witkowski et al.
2004/0207537 A1 10/2004 Keller, Jr. et al.
2004/0243813 A1 12/2004 Farris et al.
2005/0024184 A1 2/2005 Chuey
2005/0024185 A1 2/2005 Chuey
2005/0024229 A1 2/2005 Chuey
2005/0024230 A1 2/2005 Chuey
2005/0024254 A1 2/2005 Chuey
2005/0024255 A1 2/2005 Chuey
2005/0026601 A1 2/2005 Chuey
2005/0026602 A1 2/2005 Chuey et al.
2005/0026605 A1 2/2005 Guthrie et al.
2005/0046545 A1 3/2005 Skekloff et al.
2006/0181428 A1 8/2006 Blaker et al.
2006/0217850 A1 9/2006 Geerlings et al.
2006/0232376 A1 10/2006 Blaker
2006/0234670 A1 10/2006 Blaker et al.

FOREIGN PATENT DOCUMENTS

EP 0 372 285 A1 6/1990
EP 0 670 402 A1 9/1995
EP 1 052 608 A1 11/2000
EP 1 129 441 B1 9/2001
FR 2 792 444 10/2000
GB 2171545 A 8/1986
GB 2 182 790 A 10/1986
GB 2 265 482 A 9/1993
GB 2 302 751 A 6/1996
GB 2 325 552 11/1998
GB 2 336 433 4/1999
GB 2335773 A 9/1999
GB 2 366 433 5/2000
WO WO94/02920 7/1993

| | | | |
|---|---|---|---|
| WO | WO94/18036 | A1 | 8/1994 |
| WO | WO99/63308 | A | 9/1999 |
| WO | WO99/64274 | A1 | 12/1999 |
| WO | WO 00/12850 | A1 | 3/2000 |
| WO | WO 00/29699 | | 5/2000 |
| WO | WO 00/70577 | | 11/2000 |
| WO | WO 02/80129 | A2 | 10/2002 |
| WO | WO 2004/034352 | | 4/2004 |
| WO | WO 2004/036526 | | 4/2004 |
| WO | WO 2004/043750 | A2 | 5/2004 |
| WO | WO 2004/066514 | | 8/2004 |
| WO | WO 2004/077729 | A2 | 9/2004 |
| WO | WO 2004/104966 | A2 | 12/2004 |
| WO | WO 2004/104966 | A3 | 12/2004 |
| WO | WO 2005/002080 | | 1/2005 |

OTHER PUBLICATIONS

HomeLink Wireless Control System Lighting Kit Installation, http://www.homelink.com/print/lighting_print.html.

HomeLink Wireless Control System Frequently Asked Questions, http://www.homelink.com/print/faq_print.html.

HomeLink Universal 2 Channel Receiver Model PR433-2, Installation Instructions, 114A2437, 2000.

Getting Started with HomeLink, Programming Garage Door Openers and Gates.

HomeLink Universal Transceiver Lighting Package Programming.

Microchip HCS360 Keeloq Code Hopping Encoder, Microchip Technology Inc., DS40152E, 2002.

Microchip TB003, An Introduction to Keeloq Code Hopping, Microchip Technology Inc., DS91002A, 1996.

Chamberlain LiftMaster Professional Universal Receiver Model 635LM Owner's Manual, 114A2128C, The Chamberlain Group, Inc., 2002.

Flash2Pass eliminates past garage door opener hassles using a secure and easy-to-install system, Press Release, F2P Electronics, Inc., Jan. 2002.

Flash2Pass Easy Set Up Instructions, v031003, F2P Technologies.

The X-10 Powerhouse Power Line Interface Model #PL513 and Two-Way Power Line Interface Model #TW523, Technical Note, Dave Rye, Rev. 2.4, PL/TWTN/1291.

Neural Networks for ECCM, Simon Haykin, McMaster University Communications Research Laboratory Technical Report 282, Neurocomputing for Signal Processing, Feb. 1994, http://www.crl.mcmaster.ca/cgi-bin/makerabs.pl?282.

DRFM Theory of Operation, KOR Electronics, Inc., http://www.korelectronics.com/product_sheets/theory-of-operations/drfm-theoryofop.htm.

Fabrication Process Combines Low Cost and High Reliability, Murat Eron, Richard J. Perko and R. James Gibson, Microwaves & RF, Oct. 1993.

Pager and Garage Door Opener Combination, Gail Marino, Motorola Technical Developments, vol. 10, Mar. 1990.

Search and Examination Report Under Sections 17 and 18(3), Sep. 25, 2003.

Combined Search and Examination Report Under Section 17 and 18(3) mailed Nov. 30, 2004 for the corresponding European patent application GB 0415908.3.

Combined Search and Examination Report Under Section 17 and 18(3) mailed Nov. 2, 2004 for European patent application GB 0416789.6.

Combined Search and Examination Report Under Sections 17 and 18(3) mailed Nov. 2, 2004 for European patent application GB0416753.2.

Combined Search and Examination Report Under Sections 17 and 18(3) for European Application No. GB0416742.5 dated Oct. 26, 2004.

German Search/Examination Document, German Patent Application No. 103 14 228.2, Dec. 14, 2004.

Marantec America Accessories Listing, Sep. 30, 2002, 3 pages.

Marantec America Products Listing, Sep. 30, 2002, 3 pages.

Marantec America Openers With a Difference Listing, Sep. 30, 2002, 2 pages.

"Marantec Expands Its Line of Radio Controls by Introducing the HomeLink compatible 315MHz Modular Frequency System," Marantec America News, Sep. 30, 2002, 3 pages.

Photo Modules for PCM Remote Control Systems, Vishay, TSPO22, Document No. 82095, Rev. 4, Mar. 30, 2001, 7 pages.

IP Receiver for High Data Rate PCM at 455 kHz, Vishay TSPO7000, Document No. 82147, Rev. 4, Mar. 29, 2001, 7 pages.

* cited by examiner

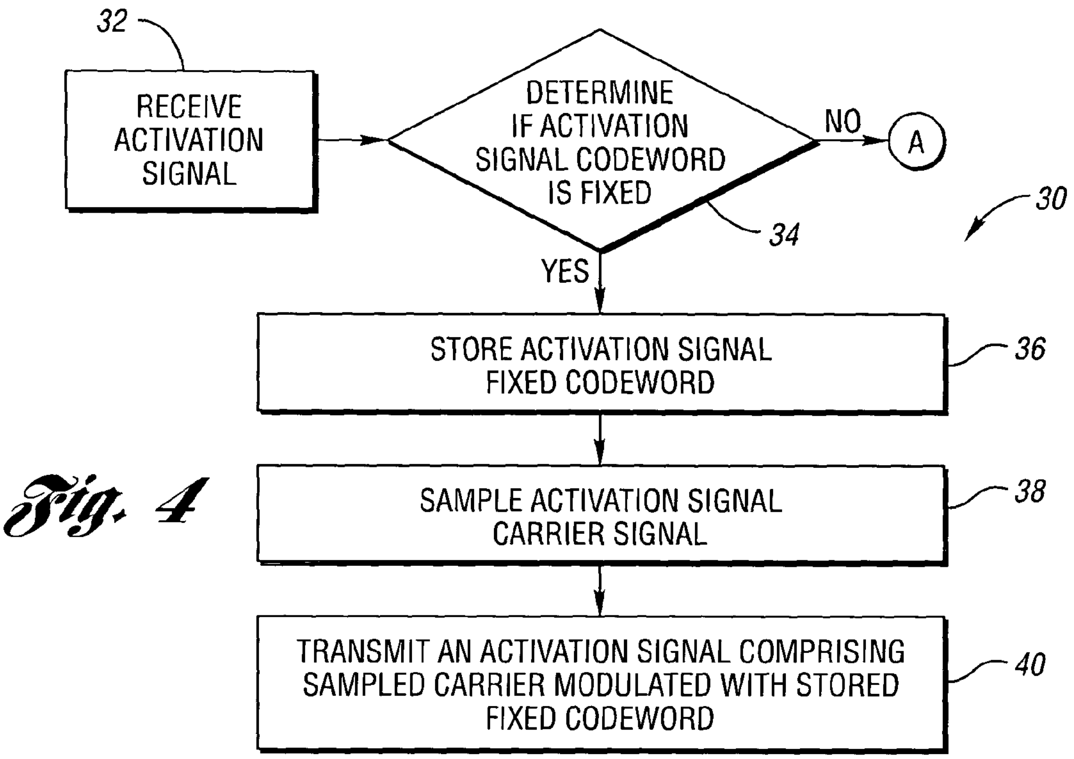
Fig. 4
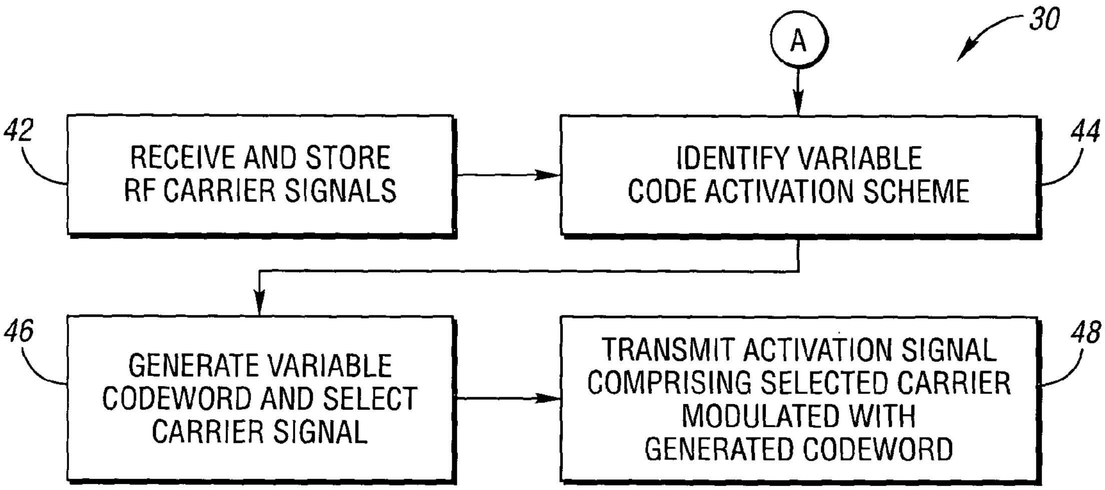
Fig. 5
Fig. 6
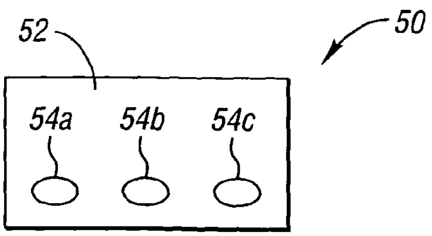

UNIVERSAL VEHICLE BASED GARAGE DOOR OPENER CONTROL SYSTEM AND METHOD

BACKGROUND OF THE INVENTION

1. Field of the Invention

This invention relates to vehicle based universal control systems and methods for remotely controllable garage door opening systems.

2. Background Art

Garage door openers, security gates and the like may be operated from a remote control. As an example only, the remote control system may be a remotely controlled garage door opener (GDO) having a receiver associated with the GDO, and at least one remote transmitter, which could be placed or carried in an automotive vehicle for use within the vehicle to operate the GDO system.

Customer wishes and safety considerations suggest the desirability for integrating such a remote control into the interior of the automotive vehicle. In that regard, it is known to provide a programmable or "trainable" garage door transceiver in a vehicle, where the transceiver receives and learns characteristics of a GDO activation signal from an existing GDO remote transmitter and then, when prompted by a user, generates and transmits an activation signal having the same characteristics in order to operate the GDO system. One problem with such devices is the need to put a complex electronic device within an automobile, where space is at a premium. Another problem with such devices is the difficulty experienced by users programming such devices to work with their GDO systems.

Another proposed solution is a device that must be wired into the existing GDO circuit in order to operate. However, installation of such a device may be beyond the capabilities of some users. Yet another proposed solution is to place an existing GDO remote transmitter into a wall-mountable device that includes a receiver. A transmitter in the vehicle configured to operate with the device transmits a signal for receipt by the device receiver. The device mechanically operates the existing GDO remote transmitter based on the received signals from the vehicle transmitter. A difficulty associated with this device is designing a housing or receptacle capable of actuating the buttons employed in the wide range of available GDO remote transmitters.

What is needed is a universal vehicle-based remote control system and method that does not require complex electronics within the vehicle, does not require wiring into the GDO system, and is more easily set up by a vehicle owner. The present invention provides a vehicle-based control system and method that is compatible with a wide variety of GDO systems, and is capable of interaction with a user to determine operating characteristics of the user's GDO system.

SUMMARY OF THE INVENTION

Accordingly, the present invention provides a vehicle-based control system and method for use with a barrier operating system.

According to one embodiment of the present invention, a vehicle-based control system is provided for use with a barrier operating system. The barrier operating system comprises a motor for opening and closing a barrier, a receiver in communication with the motor, and a remote transmitter for transmitting an activation signal, the activation signal comprising a radio frequency carrier signal modulated with a codeword, the activation signal for receipt by the receiver for use in activating the motor to open and close the barrier. The control system comprises a transceiver to be mounted in a vehicle and configured to receive a plurality of radio frequency carrier signals, and transmit an activation signal for receipt by the barrier operating system receiver. The control system further comprises a controller to be mounted in a vehicle in communication with the transceiver and a user input device. The controller is configured to store the plurality of received radio frequency carrier signals, and receive user input identifying an activation scheme having at least a variable codeword format associated therewith. In response to user input, the controller is further configured to generate a variable codeword based on the identified activation scheme, select one of the plurality of stored carrier signals, and control the transceiver to transmit an activation signal comprising the selected carrier signal modulated with the generated variable codeword.

According to another embodiment of the present invention, a vehicle-based control method is provided for use with a barrier operating system. The barrier operating system comprises a motor for opening and closing a barrier, a receiver in communication with the motor, and a remote transmitter for transmitting an activation signal, the activation signal comprising a radio frequency carrier signal modulated with a codeword, the activation signal for receipt by the receiver for use in activating the motor to open and close the barrier. The control method comprises identifying an activation scheme having at least a variable codeword format associated therewith, generating a variable codeword based on the identified activation scheme, and selecting one of a plurality of stored carrier signals. The selected carrier signal and the generated variable codeword are for use in transmitting an activation signal.

The following detailed description and accompanying drawings set forth preferred embodiments of the present invention.

BRIEF DESCRIPTION OF THE DRAWINGS

FIG. 4 is a simplified, exemplary flowchart depicting a portion of one embodiment of the control method of the present invention;

FIG. 5 is a simplified, exemplary flowchart depicting another portion of one embodiment of the control method of the present invention; and FIG. 6 is a simplified, exemplary block diagram of a user interface or input/output device for use in one embodiment of the control system of the present invention.

DETAILED DESCRIPTION OF THE PREFERRED EMBODIMENT(S)

Referring now to the FIGURES, the preferred embodiments of the control system and method of the present invention will be described. As previously discussed, garage door openers, security gates and the like may be operated from a remote control. The remote control system may be a remotely controlled garage door opener (GDO) having a receiver associated with the GDO, and at least one remote transmitter, which could be placed or carried in an automotive vehicle for use within the vehicle to operate the GDO system.

As also previously noted, it is desirable to integrate such a remote control into the interior of the automotive vehicle. In that regard, it is known to provide a programmable or "trainable" garage door transceiver in a vehicle, where the transceiver receives and learns characteristics of a GDO activation signal from an existing GDO remote transmitter and then, when prompted by a user, generates and transmits an activation signal having the same characteristics in order to operate the GDO. One problem with such devices is the need to put a complex electronic device within an automobile, where space is at a premium. Another problem with such devices is the difficulty experienced by users programming such devices to work with their GDO systems.

It is also known to provide a device that is wired into the existing GDO circuit in order to operate the GDO system. However, installation of such a device may be beyond the capabilities of some users. Yet another proposed solution is to place an existing GDO remote transmitter into a wall-mountable device that includes a receiver. A transmitter in the vehicle configured to operate with the device transmits a signal for receipt by the device receiver. The device mechanically operates the existing GDO remote transmitter based on the received signals from the vehicle transmitter. A difficulty associated with this device is designing a housing or receptacle capable of actuating the buttons employed in the wide range of available GDO remote transmitters.

What is needed is a universal vehicle-based remote control system and method that does not require complex electronics within the vehicle, does not require wiring into the GDO system, and is more easily set up by a vehicle owner. The present invention provides a vehicle-based control system and method that is compatible with a wide variety of GDO systems, and is capable of interaction with a user to determine operating characteristics of the user's GDO system.

Figure 1:
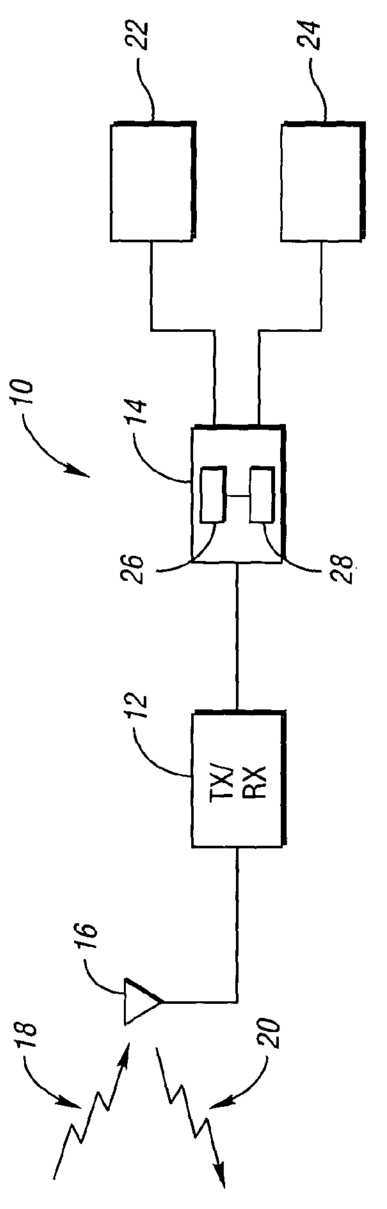
FIG. 1 is a simplified, exemplary block diagram of one embodiment of the control system of the present invention.

Referring now to FIG. 1, a simplified, exemplary block diagram of one embodiment of the control system of the present invention is shown, denoted generally by reference numeral 10. As seen therein, the system (10) comprises a transceiver (12) provided in communication with a controller (14). Transceiver (12) is also provided in communication with an antenna (16) for use in receiving and transmitting various signals (18, 20), as will be described in greater detail below.

Controller (14) is also provided in communication with user input and output devices (22, 24), through which controller (14) provides and receives information to and from a user (not shown). As will be described in greater detail below, it should be noted that user input and output devices (22, 24) may be embodied in a single user interface device. Controller (14) preferably comprises a processor (26) and a Digital Radio Frequency Memory (DRFM) (28) for use in practicing various aspects of the present invention, as will also be described in greater detail below.

Figure 2:
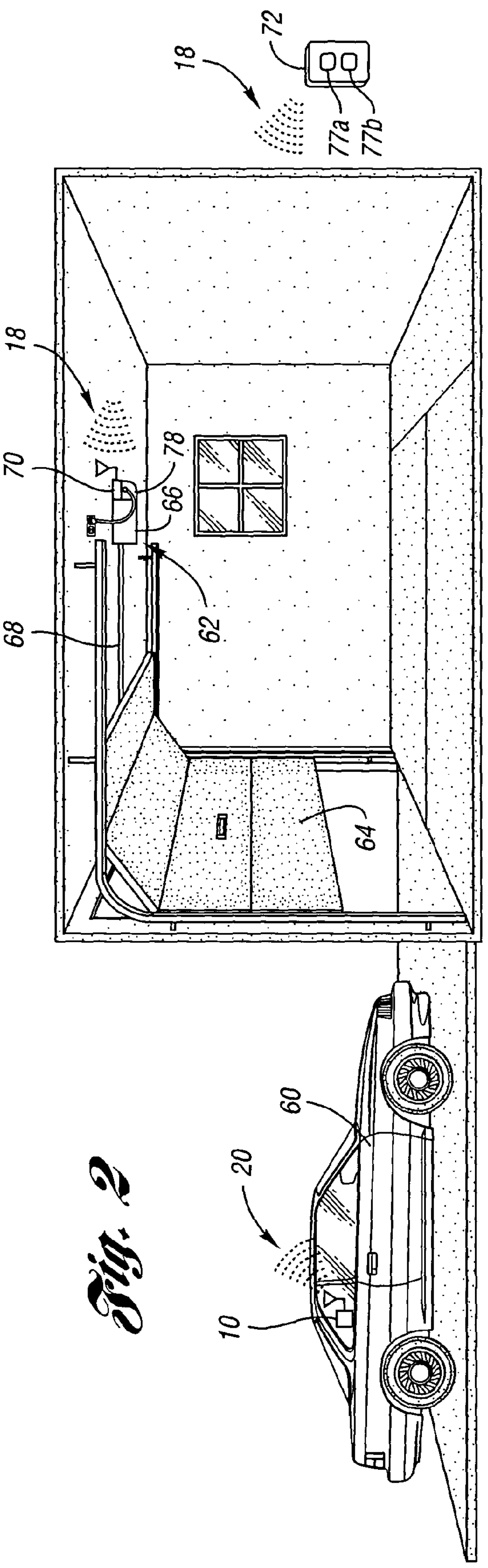
FIG. 2 is a simplified diagram of an exemplary environment for the present invention.

FIG. 2 depicts a simplified diagram of an exemplary environment for the present invention. As seen therein, system (10), including transceiver (12), controller (14), antenna (16), and user input and output devices (22, 24) (see, FIG. 1), is to be mounted and/or integrated together or separately into the interior of an automotive vehicle (60), such as for example in a headliner, rearview mirror, sun visor, dashboard, console, pillar, steering wheel, door panel, panel, seat or any other interior vehicle location or locations accessible to a vehicle occupant.

As previously noted, the present invention is for use with a remotely controllable barrier operating system, such as a security gate system or a GDO system (62). In that regard, such systems typically include a barrier, such as a security gate or garage door (64), a motor (66) connected to the gate or garage door (64) through a drive chain, drive belt, drive shaft or screw gear (68), a radio frequency receiver (70) in communication with the motor (66), and at least one remote transmitter (72). The remote transmitter (72) is used by an operator (not shown) to transmit a radio frequency activation signal (18) for receipt by the GDO system receiver (70). Upon receipt of such an activation signal (18), the receiver (70) activates the motor (66) in order to open or close the barrier (64).

More specifically, in remotely controlled GDO systems (62), a remote control transmitter (72) transmits a radio frequency activation signal (18) in response to the user (not shown) pressing an activation button (**77*a*, 77*b*) on the transmitter (72). In a typical system, one button (77*a*) on the remote transmitter (72) may be provided for opening and closing the garage door (64), and another button (77*b*) may be provided for turning on or off a light (78**).

As is well known in the art, the activation signal (18) is generated by modulating a radio frequency carrier signal with a data word. The simplest form of modulation is on-off keying, although various other types of modulation are known, including polar, bipolar, duobinary, Manchester, and the like. With on-off modulation, a binary "one" in the data word results in transmission of the radio frequency carrier signal, and a binary "zero" results in no transmission of the carrier signal.

The data word used to modulate the carrier signal is typically made up of a number of different parts. First, the data word includes one or more bits to indicate a function (i.e., which button on the transmitter was pushed, such as the button for opening/closing the garage door or the button for activating/deactivating a light). Second, the data word includes a transmitter identification (ID), which allows the GDO system receiver (70) to determine if a received activation signal (18) was transmitted by a recognized remote transmitter (72), and which remote transmitter (72) was activated. Third, the data word includes a codeword to prevent unauthorized or accidental activation of the garage door opener.

As is also well known in the art, in many older GDO systems, the same codeword is used each time the remote transmitter sends an activation signal, such that the codeword is referred to as "fixed." In such systems, both the remote transmitter (72) and the GDO system receiver (70) are typically programmed by a user with the same fixed codeword, such as by similarly setting switches in each. Such switches, which may be Dual Inline Programmable (DIP) switches, can be changed or re-set by the user if desired. Since both the remote transmitter (72) and the GDO receiver (70) are programmed with the same fixed codeword, the GDO system acts to open or close the garage door (64) (or activate or deactivate a light (78)) each time an activation signal (18) from the remote transmitter (72) is received by the GDO system receiver (70).

Figure 3:
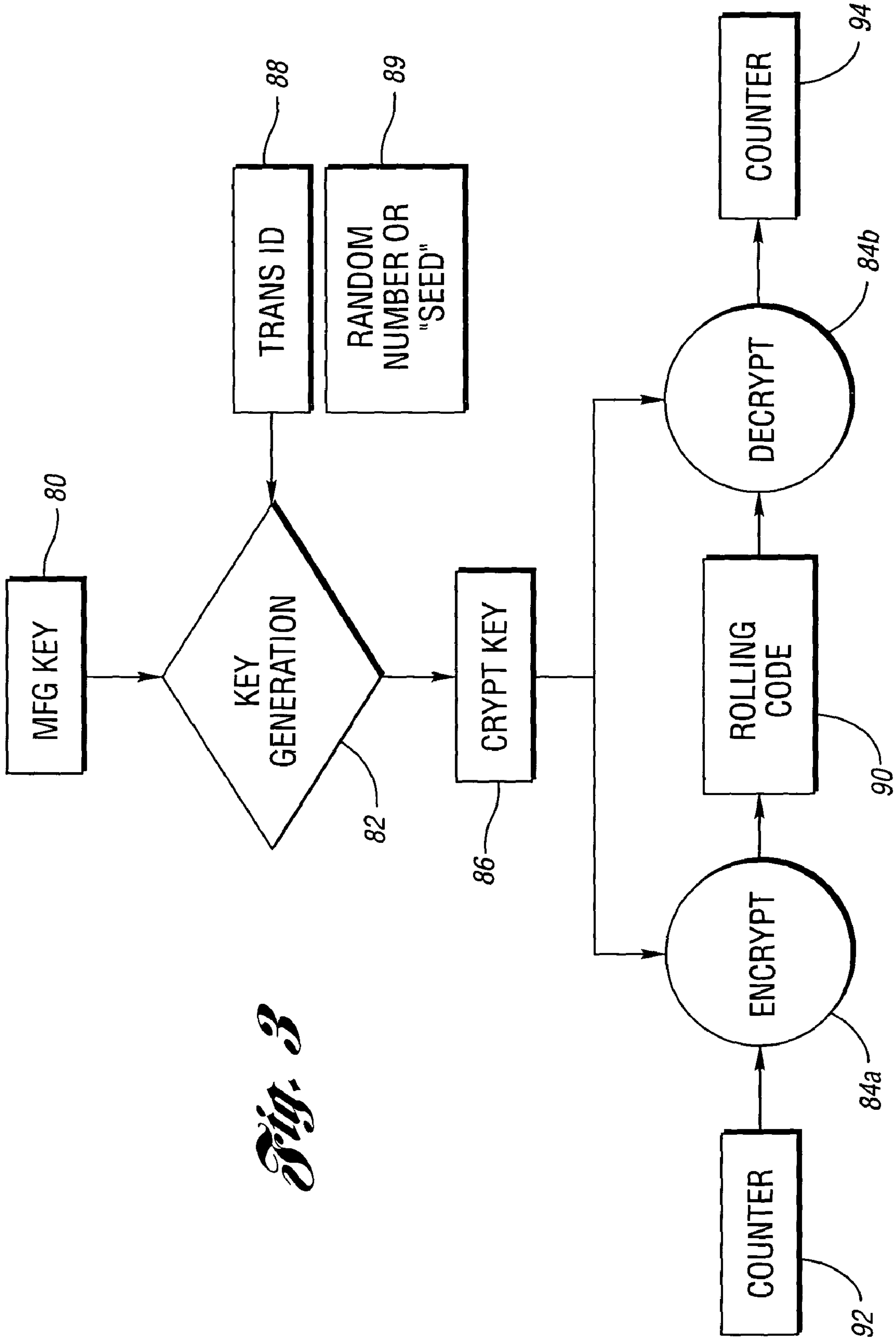
FIG. 3 is a simplified flowchart depicting an exemplary variable codeword technique for a barrier operating system.

For increased security, newer GDO systems utilize a different codeword each time the activation signal is sent by a remote transmitter, such that the codeword is referred to as "rolling" or "variable." FIG. 3 shows a simplified flowchart depicting an exemplary variable codeword technique for a barrier operating system, such as a GDO system.

As seen therein, and with continuing reference to FIG. 2, in a typical variable code GDO system (62), a manufacturer's key (80), a crypt key algorithm (82), and an encryption algorithm (84*a*, 84*b*) may be stored in both the remote transmitter (72) and the GDO system receiver (70). The GDO receiver (70) is placed in a "learn" mode, and the user activates the remote transmitter (72) to send an activation signal (18). In that regard, the remote transmitter (72) uses the stored crypt key algorithm (82) to generate a crypt key (86) based on its stored transmitter ID (88) and the stored manufacturer's key (80). Alternatively, remote transmitter (72) may use the stored crypt key algorithm (82) to generate a crypt key (86) based on the stored manufacturer's key (80) and a random number (89), which may be referred to as a "seed." Using the stored encryption algorithm (84*a*), the remote transmitter (72) then generates a variable codeword (90) based on the crypt key (86) and a stored counter value (92).

The activation signal (18) sent by the remote transmitter (72) includes a carrier signal modulated with the variable codeword (90) and the transmitter ID (88). That activation signal (18) is received by the GDO system receiver (70) which, as noted above, has been placed in a "learn" mode, such as by activating a switch (not shown) on the receiver (70). Using the stored crypt key algorithm (82), the GDO system generates the crypt key (86) for that remote transmitter (72) based on the stored manufacturer's key (80) and the transmitter ID (88) conveyed by the received activation signal (18). Alternatively, using the stored crypt key algorithm (82), the GDO system (62) may generate the crypt key (86) for that remote transmitter (72) based on the stored manufacturer's key (80) and the random number or "seed" (89). In that regard, to do so, remote transmitter (72) must transmit random number or "seed" (89) to GDO receiver (70) during the "learn" mode of the GDO system (62). Remote transmitter (72) may be activated to transmit random number or "seed" (89) in any fashion known in the art, such as by a particular combination or combinations of button pushes on remote transmitter (72) by an operator. Using the stored encryption algorithm (84*b*), the GDO system then generates and stores a counter value (94) based on the crypt key (86) for that remote transmitter (72) and the variable codeword (90) conveyed by the received activation signal (18). In such a fashion, the GDO system receiver (70) has been "trained" to the remote transmitter (72).

Having been successfully "trained," the GDO system (62) exits the "learn" mode, and enters an "operating" mode. Thereafter, actuation of the remote transmitter (72) again sends an activation signal (18) that includes a carrier signal modulated with a variable codeword (90) and the transmitter ID (88). Upon receipt of the activation signal (18), using the stored encryption algorithm (84*b*), the GDO system generates a counter value (94) based on the variable codeword (90) conveyed by the received activation signal (18) and the stored crypt key (86) for that remote transmitter (72), which the GDO system retrieves based on the transmitter ID (88) also conveyed by the received activation signal (18). In such a fashion, if the variable codeword (90) conveyed by the received activation signal (18) "decrypts" (84*b*) to a counter value (94) that matches or is within a predefined range of the counter value maintained by the GDO system, the GDO system activates the motor (66) to open or close the garage door (64) (or activate or deactivate a light (78)).

In that regard, it should be noted that, as is well known in the art, encryption/decryption algorithms (84*a*, 84*b*) may be the same. It should also be noted that if the transmitter ID (88) conveyed by a received activation signal (18) does not match a transmitter ID (88) stored by the GDO system, then that activation signal (18) is ignored by GDO system (62), which takes no action. It should still further be noted that where GDO system (62) uses crypt key algorithm (82) to generate crypt key (86) based on manufacturer's key (80) and random number or "seed" (89), that random number or "seed" (89) is transmitted by remote transmitter (72) to GDO receiver (70) only during the "learn" mode for GDO system (62). That is, random number or "seed" (89) is not thereafter transmitted by remote transmitter (72) as part of an activation signal (18) for receipt by GDO receiver (70) during the normal "operating" mode of GDO system (62).

In a typical GDO system (62), the same radio frequency carrier signal is modulated by the codeword each time the activation signal is transmitted, although different carrier frequencies may be used in different GDO systems and by different system manufacturers. Significantly, however, as is well known in the art, all carrier signals used in the various manufacturers'GDO systems are required by regulation to fall within a pre-defined band of the radio frequency spectrum. As is also well known in the art, in addition to either a "fixed" or "variable" codeword format and different carrier frequencies, activation signals for different remotely controlled GDO systems can have different data formats (number and location of bits), different baseband modulation techniques (how ones and zeros are represented in a digital signal, e.g., on-off, polar, bipolar, duobinary, Manchester, etc.), and different broadband modulation techniques (how the carrier is modulated with the digital signal, e.g., on-off keying, frequency modulation, etc.) The various possible combinations of these characteristics, including carrier frequencies, codeword formats, data formats, baseband modulation techniques, broadband modulation techniques, etc., may be referred to as activation schemes. In that regard, such characteristics of activation schemes, as well as variable codeword techniques, are discussed in U.S. patent application Ser. No. 10/630,013, entitled "Radio Relay Appliance Activation," filed on the same date as the present application, published as U.S. patent application Publication Ser. No. 2005/0024253, which is commonly owned by the assignee of the present application, and which is hereby incorporated by reference in its entirety.

Referring next to FIGS. 4 and 5, simplified, exemplary flowcharts depicting portions of the control method of the present invention are shown, denoted generally by reference numeral 30. As seen in FIG. 4, and with continuing reference to FIGS. 1-3, according to the control method (30) of the present invention, antenna (16), transceiver (12), and controller (14) may be used to receive (32) an activation signal (18) transmitted from a GDO system remote transmitter (see (72) in FIG. 2).

Controller (14) looks for baseband data including a codeword in the received activation signal (18) in order to determine (34) whether or not the codeword is fixed. In that regard, a remote transmitter (72) is typically placed in close proximity to transceiver (12) while transmitting an activation signal (18). As a result, activation signal (18) will be considerably stronger than any background radio frequency noise or interfering signals. Since the received activation signal (18) will be strong, controller (14) may use a well known envelope detector to retrieve the codeword from received activation signal (18).

If the codeword is fixed, controller (14) stores (36) that fixed codeword, and samples (38) the radio frequency carrier of the received activation signal (18). As previously discussed, controller (14) preferably uses a DRFM (28) for sampling (38) the radio frequency carrier of the received activation signal (18). The stored fixed codeword and the sampled radio frequency carrier signal are subsequently used by the controller (14) to control transceiver (12) to transmit (40) an activation signal (20) for actuating the GDO system (62), the activation signal (20) comprising the sampled carrier signal modulated by the fixed codeword. It should be noted that the activation signal (20) is transmitted (40) in response to input from a user via user input device (22). In that regard, DRFM (28), including its use in sampling, generating and/or transmitting a radio frequency carrier, is described in U.S. patent application Ser. No. 10/306,077, entitled "Programmable Transmitter And Receiver Including Digital Radio Frequency Memory," filed Nov. 27, 2002, published as U.S. Patent Application Publication No. 2004/0100391, which is commonly owned by the assignee of the present application, and which is hereby incorporated by reference in its entirety, as well as in U.S. patent application Ser. No. 10/630,103, entitled "Radio Relay Appliance Activation," previously incorporated by reference in its entirety.

Alternatively, if controller (14) determines (34) that the codeword is not fixed (e.g., if controller (14) determines (34) that the codeword is variable), controller (14) preferably receives input from a user (not shown) via user input device (22) in order to identify (44) (see FIG. 5) an activation scheme including at least a variable codeword format. Referring now to FIG. 5, and with continuing reference to FIGS. 1-4, after the controller (14) identifies (44) an activation scheme comprising at least a variable codeword format, controller (14) generates (46) a variable codeword and selects (46) a stored carrier signal. In that regard, preferably during set-up of the system (10), such as at a factory, antenna (16), transceiver (12) and controller (14) have previously received and stored (42) a plurality of radio frequency carrier signals. The generated variable codeword and the selected stored carrier signal are subsequently used by the controller (14) to control transceiver (12) to transmit (48) an activation signal (20) for actuating the GDO system (62), the activation signal (20) comprising the selected stored carrier signal modulated by the generated variable codeword. In that regard, the activation signal (20) is transmitted (48) in response to input from a user via user input device (22).

It should be noted that the simplified flowcharts depicted in FIGS. 4 and 5 are exemplary of the method (30) of the present invention. In that regard, the various activities and steps described in connection with the method (30) of the present invention could be executed in sequences other than those shown in FIGS. 4 and 5, including the execution of a subset of the activities and steps shown and/or the execution of one or more activities or steps simultaneously. For example, if a user knows that the user's GDO system (62) has a variable code format, the user need not activate the GDO system remote transmitter (72) to transmit an activation signal (18) for receipt (32) by transceiver (12) via antenna (16). Instead, the user could simply proceed to input information, such as by pressing one or more buttons or combinations of buttons on user input device (22), that identifies (44) to controller (14) an activation scheme comprising at least a variable code format.

With reference to FIGS. 1-5, the present invention preferably has initialization and operating modes. In the initialization mode, the present invention is initialized to work with either a fixed code or a variable code GDO system. More particularly, as an example only, a user first places the system (10) in an initialization mode. The user then places a GDO system remote transmitter (72) near the system (10), and activates the remote transmitter (72) by pressing its actuation button (77*a*) in order to transmit an activation signal (18) which is received by transceiver (12) via antenna (16).

As previously described, if the activation signal (18) includes a fixed codeword, that codeword is stored (36) and the carrier signal of the activation signal (18) is sampled (38). Thereafter, in an operating mode, when a user actuates the system (10), such as by pushing a button on user input device (22), the system (10), using transceiver (12) and antenna (16), transmits (40) an activation signal (20) for receipt by the GDO system receiver (70) to activate the GDO system, the activation signal (20) comprising the sampled carrier signal modulated by the stored fixed codeword.

Alternatively, if, as also previously described, activation signal (18) from the GDO system remote transmitter (72) does not include a fixed codeword (e.g., activation signal (18) includes a variable codeword), the system (10) provides an indication to the user (not shown) via user output device (24) that additional action by and/or information from the user is required. In that event, still in an initialization mode, the user then inputs information, such as by pressing one or more buttons or combinations of buttons on user input device (22), that identifies (44) to controller (14) an activation scheme comprising at least a variable codeword format.

In that regard, any number of techniques may be utilized to provide a user with the information necessary to identify the user's GDO system (62), and to thereby identify (44) an activation scheme to controller (14). For example, via user output device (24), controller (14) could prompt the user to call a toll-free telephone number, after which an operator could assist the user in identifying the user's GDO system (62). Alternatively, GDO system manufacturers could voluntarily place identifiers on the exterior of the GDO system remote transmitters (72), which could be a numeric code. Still further, automobile manufacturers could provide a list of GDO system manufacturers and other information, such as system photographs and/or descriptions, in the vehicle owner's manual. The user could also be prompted by controller (14), via user output device (24), to visit a particular website in order to obtain information identifying the user's GDO system (62). Utilizing user output device (24), controller (14) could also display information pertaining to particular GDO systems (62) sequentially, such as photographs and/or descriptions, and prompt the user to provide feedback to the controller via user input device (22) until a system is identified corresponding to the user's system.

In any event, via user input device (22), the user would then provide GDO system (62) information to controller (14), which would then identify (44) an activation scheme having at least a variable codeword format based on the GDO system (62) information. In that regard, FIG. 6 depicts a simplified, exemplary block diagram of a user interface or input/output device for use in one embodiment of the control system (10) of the present invention, denoted generally by reference numeral 50. User input/output device (50) generally corresponds to the user input and output devices (22, 24) depicted in FIG. 1.

More particularly, referring now to FIG. 6, and with continuing reference to FIGS. 1-5, user input/output device (50) preferably comprises a panel (52) having a plurality of buttons (54*a*, 54*b*, 54*c*). As previously noted, input/output device (50) is to be mounted and/or integrated, separately or together with other system (10) components, into the interior of an automotive vehicle (60), such as in a headliner, rearview mirror, sun visor, dashboard, console, pillar, steering wheel, door panel, panel, seat or any other interior vehicle location or locations accessible to a vehicle occupant.

Each of buttons (54*a*, 54*b*, 54*c*) is provided with a backlight (not shown), such as a Light Emitting Diode (LED), so that buttons (54*a*, 54*b*, 54*c*) are easily seen, especially in low ambient light conditions, and so that buttons (54*a*, 54*b*, 54*c*) may be used to provide feedback or output information to a user. In that regard, a number of different three digit codes may be used to represent the various manufacturers' GDO systems (62). As shown in FIG. 6, input/output device may be provided with three backlit buttons (54*a*, 54*b*, 54*c*) for use in inputting a particular three digit manufacturer's GDO system code.

More particularly, backlit buttons (54*a*, 54*b*, 54*c*) may be used in any fashion, such as by rapidly flashing all three lights, to indicate to the user that the activation signal (18) received from the GDO system remote transmitter (72) does not include a fixed code, that additional information is required from the user, and that the system (10) is ready for entry of such information. In that event, the user first obtains the three-digit code representing the user's GDO system (62), such as in any fashion described above in the preceding paragraphs (toll-free telephone number, transmitter identifier, vehicle owner's manual list, website, prompting, etc.), or in any other fashion.

Thereafter, or if a user knows the user's GDO system (62) is a variable codeword system, the three digit code may be input using the three backlit buttons (54*a*, 54*b*, 54*c*). For example, to enter a three digit code of "304," button 54*a* may light independently, thereby indicating system (10) readiness to receive the first digit of the three digit code. The user could then depress button 54*a* three times in order to enter the number "3," and wait. A timeout timer (not shown) for buttons (54*a*, 54*b*, 54*c*) could then deactivate the light for button (54*a*) and activate the light for button (54*b*) after a predetermined time, thereby indicating system (10) readiness to receive the second digit of the three digit code. In order to enter the number "0," the user could then simply wait for the timer to timeout, deactivating the light for button (54*b*) and activating the light for button (54*c*), thereby indicating system (10) readiness to receive the third digit of the three digit code. The user could then depress button (54*c*) four times in order to enter the number "4," and wait. After timeout of the timer, the light for button (54*c*) could be deactivated, and the lights for all buttons (54*a*, 54*b*, 54*c*) could again be flashed rapidly to indicate successful entry into system (10) of the three digit code.

Of course, a three digit code and three buttons (54*a*, 54*b*, 54*c*) are described herein as an example only. In that regard, it should be noted that the number of buttons (54*a*, 54*b*, 54*c*) provided need not match the number of digits used in any code to identify manufacturers' GDO systems. It should also be noted that any number of digits could be used for a code to identify the various GDO systems, and any number of buttons (54*a*, 54*b*, 54*c*), or any other types of input/output devices, could be used to allow a user to provide input to and/or receive output from the system (10) in any fashion and according to any techniques known in the art.

As is readily apparent from the foregoing description, input can be received from a user by system (10), and output can be provided to a user by system (10), using a single input/output device (50). However, as shown in FIG. 1, separate user input and output devices (22, 24) could also be employed. In addition, input/output device (50) may alternatively comprise a touch-screen display (52), with areas (54*a*, 54*b*, 54*c*) provided for a user to touch in order to input information. In that regard, other areas of screen (52) could be devoted to providing information visually, such as photographs and/or text information, to a user, such as for use in identifying a particular GDO system (62) or prompting a user for additional information/action as previously described.

In such a fashion, the user identifies the make and/or model of the user's GDO system (62), thereby narrowing the number of possible activation schemes for the GDO system (62). For example, a particular GDO system manufacturer may construct systems that operate on one of only a few frequencies and with only rolling codes generated with a particular encryption algorithm.

Having input such information via user input/output device (50) to controller (14), controller (14) identifies (44) an activation scheme having a set of the various characteristics previously described, including at least a variable codeword format, known to be used for such a GDO system (62). Using particular stored encryption and/or crypt key algorithms (82, 84) associated with the variable codeword format, controller (14) then generates whatever encryption information may be required and, via user input/output device (50), prompts the user to place the GDO system receiver in a "learn" mode. Controller (14) then controls transceiver (12) to transmit an activation signal (20), thereby "training" the GDO system receiver (70) to the system (10), including transceiver (12), as previously described in detail above.

In that regard, where the particular variable codeword format includes using a crypt key algorithm (82) to generate a crypt key (86) based on a manufacturer's key (80) and a random number or "seed" (89), controller (14) also controls transceiver (12) to transmit that random number or "seed" (89) for receipt by GDO system receiver (70) during the "learn" mode for GDO system (62), as described in detail above. This is preferably accomplished by controller (14) electrically duplicating the input which would result from the mechanical button pushes necessary for transceiver (12) to transmit the random number or "seed" (89), such that the transceiver (12) transmits that random number or "seed" (89) automatically. The automatic transmission of random number or "seed" (89) by transceiver (12) is preferably accomplished by interleaving data packets identified as "seeds" in a transmission to GDO system receiver (70). Alternatively, a user may activate buttons (54*a*, 54*b*, 54*c*) on transceiver (12) as required in order to transmit the random number or "seed" (89). Controller (14), via user input/output device (50), may also query the user to provide feedback as to whether or not an activation signal (20) transmitted by the system (10) successfully operated the user's GDO system (62).

It should also be noted that each of buttons (54*a*, 54*b*, 54*c*) may be associated with a different user GDO system. That is, where a user has two or more GDO systems or security gates, as part of the initialization mode, the user may indicate which of buttons (54*a*, 54*b*, 54*c*) is to be associated with a particular GDO system (62) as a result of such initialization. Thereafter, in an operating mode, activation of that button (54*a*, 54*b*, 54*c*) by a user will cause controller (14) to control transceiver (12) to transmit the particular activation signal (20) for that particular GDO system (62), as described in detail above, the activation signal (20) comprising a stored carrier signal modulated by a generated variable codeword.

As previously described, controller (14) preferably comprises a Digital Radio Frequency Memory (DRFM) (28). DRFM (28) may be used in the system (10) and method (30)

of the present invention to sample the carrier signal of a received activation signal (18), and/or for storing carrier signals for use in transmitting activation signals (20). In that regard, DRFM (28) may be pre-programmed, such as during system (10) set-up at a factory, with appropriately sampled versions of various known carrier signals. That is, DRFM (28) may be used to store a plurality of radio frequency carrier signals for use by controller (14) and transceiver (12) in generating and transmitting variable codeword activation signals (20). As also previously described, controller (14) also preferably comprises a processor (26). In that regard, processor (26) may be used to perform the various functions of controller (14) described above, and preferably includes a memory (not shown) for storing information concerning the various characteristics of activation signals for the variety of known GDO systems, including, but not limited to, carrier frequency information, data formats, manufacturers' keys, encryption and crypt key algorithms, and baseband and broadband modulation information.

As is readily apparent from the foregoing description, the present invention provides a universal vehicle-based remote control system and method that does not require complex electronics within the vehicle, does not require wiring into the GDO system, and is more easily set up by a vehicle owner. The present invention provides a vehicle-based control system and method that is compatible with a wide variety of GDO systems, and is capable of interaction with a user to determine operating characteristics of the user's GDO system.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle-based control system for use with a barrier operating system comprising a motor for opening and closing a barrier, a receiver in communication with the motor, and a remote transmitter for transmitting an activation signal, the activation signal comprising a radio frequency carrier signal modulated with a codeword, the activation signal for receipt by the receiver for use in activating the motor to open and close the barrier, the control system comprising:

(a) a transceiver to be mounted in a vehicle and configured to
  (1) receive sampled versions of a plurality of radio frequency carrier signals, and
  (2) transmit an activation signal for receipt by the barrier operating system receiver; and
(b) a controller to be mounted in a vehicle in communication with the transceiver and a user input device, the controller configured to
  (1) store the sampled versions of the plurality of radio frequency carrier signals in a digital radio frequency memory (DRFM),
  (2) receive user input identifying an activation scheme having at least a variable codeword format associated therewith, and
  (3) in response to the user input,
    (i) generate a variable codeword based on the identified activation scheme,
    (ii) select a radio frequency carrier signal corresponding to one of the sampled versions of the radio frequency carrier signals based on the identified activation scheme and transfer the sampled version of the selected radio frequency carrier signal from the DRFM to the transceiver, and
    (iii) control the transceiver to transmit an activation signal comprising the sampled version of the selected radio frequency carrier signal modulated with the generated variable codeword.

2. The system of claim 1 wherein
(a) the transceiver is further configured to receive an activation signal from the barrier operating system transmitter, wherein the codeword of the received activation signal is fixed, and
(b) the controller is further configured to
  (1) store the fixed codeword of the received activation signal,
  (2) sample the carrier signal of the received activation signal, and
  (3) control the transceiver to transmit an activation signal comprising the sampled carrier signal modulated with the stored fixed codeword in response to user input.

3. The system of claim 2 wherein the controller uses the DRFM to sample the radio frequency carrier signal of the received activation signal.

4. The control system of claim 1 wherein the controller is further configured to receive an indication whether the activation signal transmitted by the transceiver successfully operated the barrier operating system.

5. The system of claim 1 wherein the sampled versions of the plurality of radio frequency carrier signals are received by the transceiver and stored by the controller in the DRFM in a system set-up mode.

6. The system of claim 1 wherein the user input device comprises at least one button.

7. The system of claim 1 wherein the user input device comprises a touch-screen display.

8. A vehicle-based control system for use with a barrier operating system comprising a motor for opening and closing a barrier, a receiver in communication with the motor, and a remote transmitter for transmitting an activation signal, the activation signal comprising a radio frequency carrier signal modulated with a fixed codeword, the activation signal for receipt by the receiver for use in activating the motor to open and close the barrier, the control system comprising:

(a) a transceiver to be mounted in a vehicle and configured to
  (1) receive an activation signal from the barrier operating system transmitter, and
  (2) transmit an activation signal for receipt by the barrier operating system receiver; and
(b) a controller to be mounted in a vehicle in communication with the transceiver and a user input device, wherein the controller comprises a digital radio frequency memory (DRFM) and is configured to
  (1) store the fixed codeword of the received activation signal,
  (2) sample the carrier signal of the received activation signal using the DRFM and transfer the sampled carrier signal from the DRFM to the transceiver, and
  (3) control the transceiver to transmit an activation signal comprising the sampled carrier signal modulated with the stored fixed codeword in response to user input.

9. The system of claim 8 wherein the user input device comprises at least one button.

10. The system of claim 8 wherein the user input device comprises a touch-screen display.

11. A vehicle-based control method for use with a barrier operating system comprising a motor for opening and closing a barrier, a receiver in communication with the motor, and a remote transmitter for transmitting an activation signal, the activation signal comprising a radio frequency carrier signal modulated with a codeword, the activation signal for receipt by the receiver for use in activating the motor to open and close the barrier, the control method comprising:

(a) identifying an activation scheme having at least a variable codeword format associated therewith;

(b) generating a variable codeword based on the identified activation scheme;

(c) storing sampled versions of a plurality of radio frequency carrier signals in a digital radio frequency memory (DRFM); and (d) selecting a radio frequency carrier signal corresponding to one of the samnied versions of the radio frequency carrier signals based on the identified activation scheme, the sampled version of the selected radio frequency carrier signal and the generated variable codeword for use in transmitting an activation signal.

12. The method of claim 11 further comprising transmitting an activation signal comprising the sample version of the selected carrier signal modulated with the generated variable codeword.

13. The method of claim 12 further comprising receiving an indication whether the activation signal transmitted successfully operated the barrier operating system.

14. The method of claim 11 further comprising:

(e) receiving the sample versions of the plurality of radio frequency carrier signals for storage in the DRFM prior to identifying an activation scheme.

15. The method of claim 11 further comprising:

(d) receiving an activation signal from the barrier operating system transmitter, the received activation signal having a fixed codeword;

(e) storing the fixed codeword of the received activation signal; and (f) sampling the carrier signal of the received activation signal, the sampled carrier signal and the stored fixed codeword for use in transmitting an activation signal.

16. The method of claim 15 further comprising transmitting an activation signal comprising the sampled carrier signal modulated with the stored fixed codeword.

17. The method of claim 15 wherein sampling the carrier signal of the received activation signal includes using the DRFM to sample the carrier signal of the received activation signal.

* * * * *

UNITED STATES PATENT AND TRADEMARK OFFICE

CERTIFICATE OF CORRECTION

PATENT NO. : 7,269,416 B2
APPLICATION NO. : 10/630058
DATED : September 11, 2007
INVENTOR(S) : Warren E. Guthrie et al.

It is certified that error appears in the above-identified patent and that said Letters Patent is hereby corrected as shown below:

Column 13, Line 20, Claim 11:

Delete “samnied” and insert -- sampled --.

Column 13, Line 26, Claim 12:

Delete “sample” and insert -- sampled --.

Signed and Sealed this

Twenty-seventh Day of November, 2007

JON W. DUDAS
*Director of the United States Patent and Trademark Office*